(12) United States Patent
Stuiber et al.

(10) Patent No.: US 12,187,231 B2
(45) Date of Patent: Jan. 7, 2025

(54) COVER ASSEMBLY AND STORAGE COMPARTMENT THEREFOR

(71) Applicants: Martin Stuiber, Stulln (DE); Aly Kone, Roethenbach a. d. Pegnitz (DE); Matthias Wagner, Hahnbach (DE)

(72) Inventors: Martin Stuiber, Stulln (DE); Aly Kone, Roethenbach a. d. Pegnitz (DE); Matthias Wagner, Hahnbach (DE)

(73) Assignee: GRAMMER AG, Ursensollen (DE)

( * ) Notice: Subject to any disclaimer, the term of this patent is extended or adjusted under 35 U.S.C. 154(b) by 305 days.

(21) Appl. No.: 17/844,158

(22) Filed: Jun. 20, 2022

(65) Prior Publication Data

US 2023/0009545 A1 Jan. 12, 2023

(30) Foreign Application Priority Data

Jul. 8, 2021 (DE) .......................... 102021117727.8

(51) Int. Cl.
*B60R 7/04* (2006.01)
(52) U.S. Cl.
CPC ...................................... *B60R 7/04* (2013.01)
(58) Field of Classification Search
CPC ..... B60R 7/04; B60R 2011/0007; B60N 2/75; B60N 2/793
USPC .................................................... 296/24.34
See application file for complete search history.

(56) References Cited

U.S. PATENT DOCUMENTS 10,150,422 B2 * 12/2018 Ramaer .................. B60N 2/793
10,160,360 B2 * 12/2018 Keller ....................... B60R 7/04

FOREIGN PATENT DOCUMENTS

| CN | 111469771 A | 7/2020 | |
|---|---|---|---|
| DE | 102009001073 A1 * | 9/2010 | ............... B60R 7/04 |
| DE | 202011108262 U1 * | 2/2012 | ............... B60R 7/04 |
| DE | 102010039821 A | 3/2012 | |
| DE | 102010039821 A1 | 3/2012 | |
| DE | 102015105977 B3 * | 5/2016 | ............... B60N 3/00 |
| DE | 102017116664 A1 * | 1/2019 | ............... B60R 7/04 |

* cited by examiner

*Primary Examiner* — Scott T McNurlen
(74) *Attorney, Agent, or Firm* — Andrew Wilford

(57) ABSTRACT

A cover assembly has a base, first and second cover parts movable relative to the base about respective pivot axes between closed and open positions and respective first and second torsion springs mounted on respective pivot pins, biasing the cover parts into the respective open positions, and each having one leg supported on the base and another leg braced against the respective cover part. An adjuster can set the biasing of at least one of the springs and has a support for the one leg of the one spring that is on the base or the cover part, that is pivotal on the respective pivot pin, and that is formed with a slot through which the respective pivot pin engages. A locking formation on the support and a counter-locking formation are detachably engageable with the locking formation in different relative positions such that different spring tensions can be set.

11 Claims, 7 Drawing Sheets

COVER ASSEMBLY AND STORAGE COMPARTMENT THEREFOR

FIELD OF THE INVENTION

The invention relates first to a cover assembly, in particular for a storage compartment of a vehicle.

BACKGROUND OF THE INVENTION

Such a cover assembly comprises two cover parts. Each cover part is movable between a closed position and an open position and is biased into a respective open position by a spring. Each cover part can be held in the closed position by a latch. The latch can be released so that the cover parts can move into the open position under the force of the respective springs. The spring tension can be set by an adjuster. The biasings of the springs of both cover parts can be coordinated to one another in this way so that opening of both cover parts takes place synchronously.

A cover assembly of this kind is known from DE 10 2010 039 821 A1. To adjust the biasing force of the spring, the end of the spring is latched in one of a plurality of latching positions. The adjustability of the spring was limited with regard to fine adjustment. Furthermore, the manageability was difficult. The spring end could only be released or brought into engagement with the desired latching location by a tool.

OBJECT OF THE INVENTION

The object of the invention according to a first aspect was to create a cover assembly that is improved with respect to the adjustability and manageability of its adjuster.

SUMMARY OF THE INVENTION

The cover comprises a first cover part and a second cover part, where each cover part is movable independently of the respectively other cover part relative to a base between a closed position and an open position. The movement of the cover is for example, a rotatory, a translatory or a mixed movement with rotatory and translatory contents.

Each cover part is biased into the open position by a spring as part of an actuating device, where one leg of the spring is supported on the base and one leg bears on the cover. The spring is part of an actuating device for a cover part. Here each end region of the spring is termed a leg.

With a latch that is adjustable between a latching position and a release position, each cover part separately or both cover parts together can be held in the closed position.

The spring biasing of at least one spring can be set using an adjuster. Spring biasing means a spring tension that the spring has for example, in the open position or alternatively in the closed position. The adjuster comprises a support for a leg of the spring. The support is mounted on the cover part or the base.

The support has support formation on which a leg of the spring is supportable. Formed on the support, for example, on a leg seat, is a contact surface for the leg, which surface is enclosed by the support formation. The support forms an abutment for the leg of the spring. The leg is for example, immobile relative to the support when it is located in the leg seat.

The support is supported movably in such a way that different biasings of the spring can be set based on the movement of the support.

The support can be locked in the set position. To this end the support has at least one locking formation that can be brought into engagement with a counterlocking formation on the base or the cover part detachably, for example, by positive locking of the locking formation and counterlocking formation, in different relative positions, where for example, the different relative positions are accompanied by different spring tensions.

The support can have for example, an operating attachment on which the different relative positions of locking formation and counterlocking formation can be set by a user.

Using the inventive combination of features, the biasing of the cover is very finely adjustable if the interacting locking formation has a correspondingly fine gradation or are infinitely adjustable. The adjustability is independent of the shape of the leg. The locking formation and counterlocking formation can be designed freely.

Moreover, the manageability compared with the prior art is improved, because it is possible to form the support compared with the bare spring end in such a way that it can be grasped and adjusted more easily by the user.

The base is formed for example, by a frame of the cover. The cover comprises for example, a frame, on which each cover part is held movably, in particular pivotably. The frame permits the fitting of the cover as an assembly for example, on a container or a console with container. A spring end is supported for example, on the frame of the cover.

Each cover part is supported for example, on the base, for example, on a frame. Suitable support formation can be provided on the base for the support, and can interact with support formation on the cover part, so that each cover part is movable between the closed position and the open position.

The spring is formed for example, by a torsion spring. A torsion spring requires a small installation space for the movement between a tensioned state and a relaxed state relative to the tensioned state. High spring forces can nevertheless be achieved by the torsion spring. Furthermore, a torsion spring is insusceptible to dirt, i.e. it guarantees its function even with relatively heavy soiling.

Each cover is pivotal for example, about a separate pivot axis. A first cover part is pivotable in this case about a first pivot axis and a second cover part about a second pivot axis between the closed position and the open position.

The first pivot axis extends for example parallel to the second pivot axis.

The first pivot axis is for example on a first lateral region of the base and the second pivot axis is for example on a second lateral region of the base lying opposite the first lateral region. The lateral regions are opposite for example relative to an opening of a frame, where the frame forms the base. It is possible via the opening to access for example the storage compartment when the opening is not closed by the cover parts.

The torsion spring is for example on a pivot pin. A longitudinal center axis of the pivot pin extends for example parallel to the pivot axis of the cover part. The longitudinal center axis of the pivot pin coincides for example with the pivot axis of the respective cover part. A central region of the torsion spring that has spring coils is passed through here for example by the pivot pin. A leg can then easily load the cover part in its movement up to the open position. For example, the cover part has an extension that is connected to a leg and is biased by the leg into the open position.

For example, the support is supported at two bearing points, where one bearing point is formed by the engagement of the locking formation and counterlocking formation. The other bearing point is for example a pivot bearing.

The support is pivotal for example about the pivot pin or about a separate pivot pin. To adjust the biasing of the spring, the support can be moved in the movement direction of the leg of the torsion spring.

The support has for example an opening through which the pivot pin engages. No further structures are then required to support the support. The support and the torsion spring also have the same pivot axis, even if the torsion spring is supported on the pivot axis.

The opening of the support is formed for example as a slot. It is then possible to rotate the support about the pivot axis in order to move the support into relative positions to the base or to the cover part and thus to move the leg. Furthermore, the support is movable for example also in a radial direction to move the support between an engagement position, in which the locking formation mesh with the teeth, and a release position in which the locking formation is disengaged. The functions of adjusting the biasing and locking the spring can be realized in this manner with few parts.

The support is pivotal for example about the pivot axis of the respective cover part. The central axis of the torsion spring is also supported for example coaxially with the pivot axis of the respective cover part in such a way that the legs are pivotable approximately about the pivot axis.

The support comprises for example a radial arm on which the support formation and/or the locking formation are formed. A greater lever arm can be attained with the arm extending radially, so that the locking formation can be designed for smaller forces and they nevertheless hold the force of the biasing of the spring securely.

An operating attachment can be formed on the support. This is formed for example in such a way that the adjustment of the biasing force is possible in an ergonomically favorable manner.

The locking formation and the counterlocking formation are formed for example by interacting positive locking formation, such as for example by interacting gear teeth. The teeth are formed for example by at least one at least partially complementary tooth of a counter-toothing. The teeth are formed for example in such a way that with respect to a movement direction, a movement of the support without adjustment into the release position is possible, due to that the gear teeth can move past one another. Alternatively, a movement into the release position can always be necessary for a relative movement of the locking formation and the counterlocking formation.

According to an alternative configuration, the locking formation and the counterlocking formation are formed for example by interacting friction or clamping surfaces. Stepless adjustment of the spring tension is possible in this way. According to a second aspect, the invention relates to a storage compartment.

Such a storage compartment is known from DE 10 2010 039 821 A1. Reference is made to the above statements regarding this prior art.

The object of the invention was to create a storage compartment in which an opening can be closed with a cover assembly having two cover parts. The synchronous operation of the two cover parts is to be easily adjustable.

To attain this object, the storage compartment comprises a container with an opening via which the container can be accessed. The opening is closable by a cover assembly, where the cover is formed as described above.

In regard to the advantages of the invention, reference is made to the first aspect of the invention in order to avoid repetition.

An embodiment of the invention is described by way of example in the following description of the figures, also with reference to the schematic drawings. For the sake of clarity, identical or comparable parts or elements or regions are described here by the same reference characters, in some cases with the addition of small-case letters.

Features with regard to the adjuster that are described, depicted or disclosed only in relation to one embodiment can be provided in the scope of the invention also in the case of any other embodiment of the invention. Embodiments modified in such a way are also comprised by the invention, even if they are not depicted in the drawings.

All features disclosed are of themselves essential to the invention. The disclosure content of the documents cited and the described devices of the prior art are hereby also fully included in terms of content in the disclosure of the application, also for the purpose of incorporating individual or several features of the cover disclosed there into one or more claims of the present application. Such changed embodiments are also comprised by the invention, even if they are not depicted in the drawings.

SPECIFIC DESCRIPTION OF THE INVENTION

Figure 1:
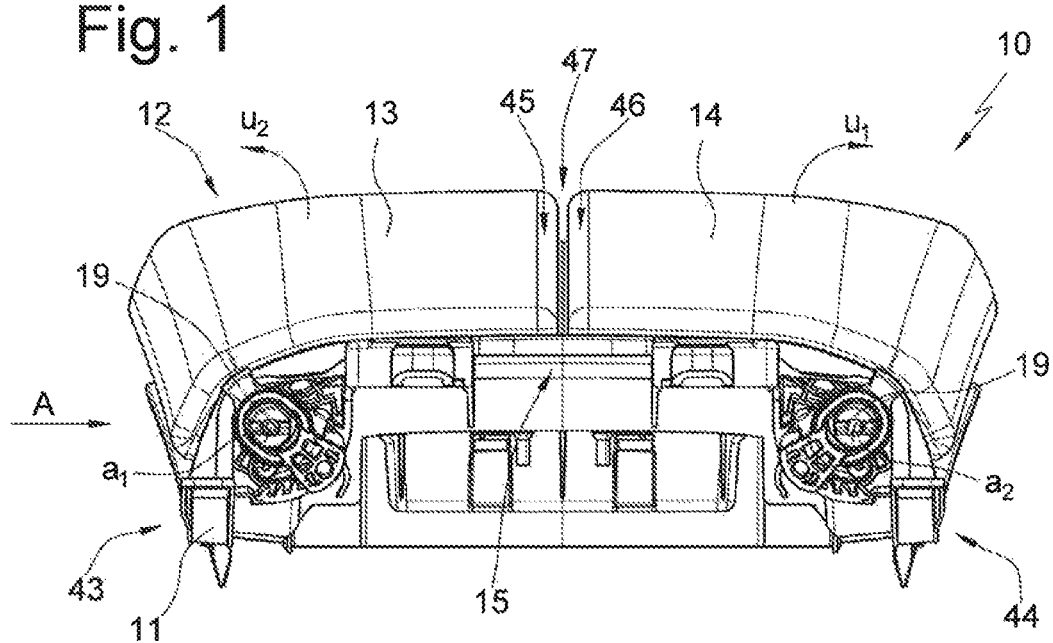
FIG. 1 a front view of the cover assembly with the two cover parts in a closed position, FIG. 2 a front view of the cover assembly with one cover part in the open position and the other cover part in the closed position, FIG. 3 a view according to view arrow A in FIG. 1, FIG. 4 a perspective rear view of the support of the adjuster, FIG. 5 a perspective view of the spring and the support of the adjuster, FIG. 6 a perspective view of a cover part, the spring and the support, FIG. 7 a perspective view of the cover assembly with an adjuster of the cover assembly shown exploded, FIG. 8 a view like FIG. 7 but with the cover parts not shown, FIG. 9 a perspective view of the cover assembly according to FIG. 1, FIG. 10 a view like FIG. 9 of the cover assembly, the support of the adjusters not being shown, FIG. 11 a view like FIG. 9 of the cover assembly, the support and the spring of the adjusters not being shown, FIG. 12 a perspective front view of the cover assembly with the adjusters in a first position according to FIG. 1, FIG. 13 a view like FIG. 12 of the cover assembly with the adjusters in a second position according to FIG. 1, FIG. 14 a view like FIG. 12 of the cover assembly with the adjusters in a third position according to FIG. 1.

A cover assembly as a whole is designated by the reference character 10 in the figures.

According to FIG. 1, the cover assembly 10 comprises a base 11—here in the form of a frame—and a cover 12 with cover parts 13 and 14. The cover 13 is pivotal about the pivot axis $a_1$ in pivoting directions $u_1$ and $u_2$ and the cover 14 is pivotal about the pivot axis $a_2$ in the pivoting directions $u_1$ and $u_2$.

Figure 2:
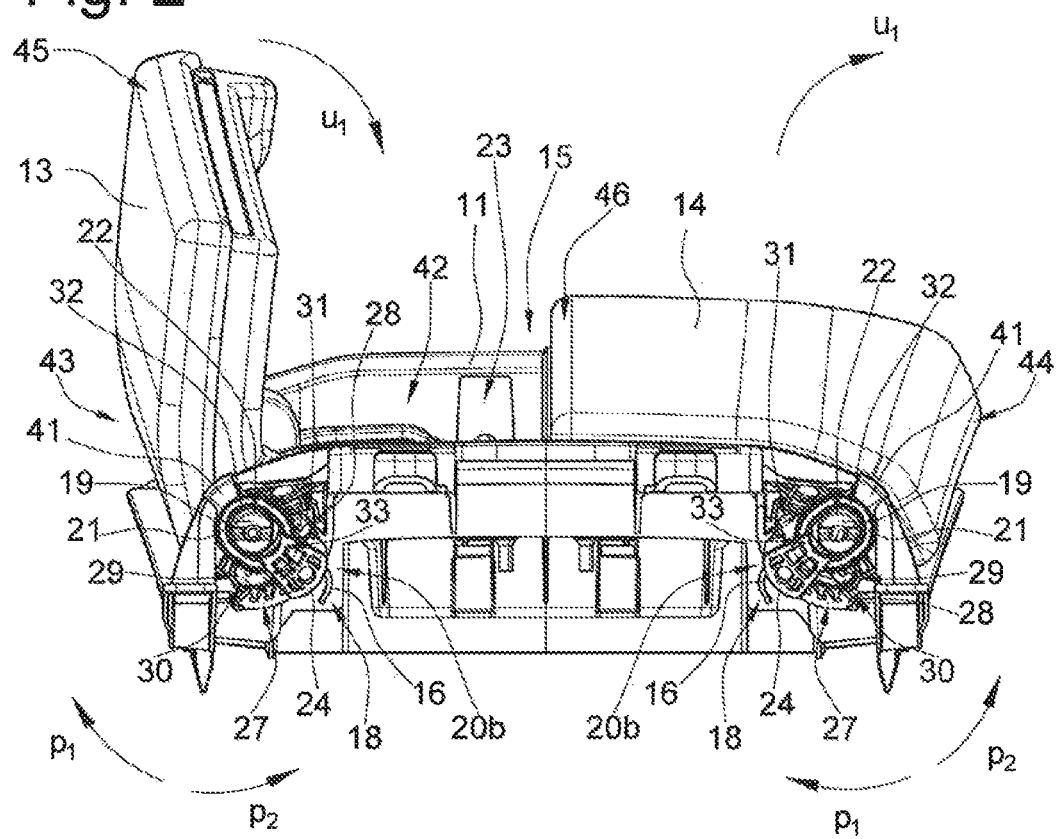
Figure 3:
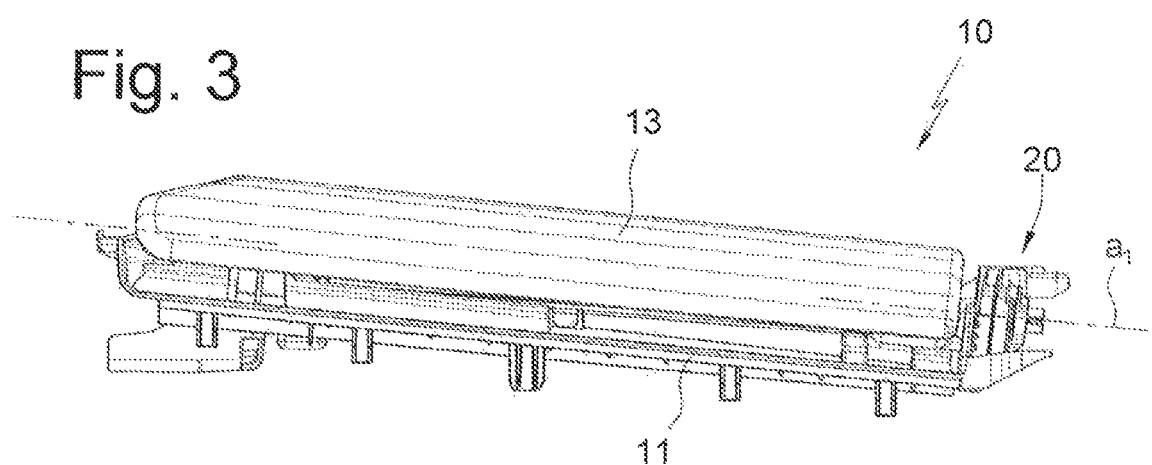

The cover parts 13 and 14 can be moved between a closed position depicted in FIG. 1 and an open position depicted in FIG. 2. The pivoting directions $u_1$ and $u_2$ are defined for each cover part so that the pivoting direction clockwise according to FIG. 1 is designated u, and the pivoting direction counterclockwise is designated $u_2$. The cover part 13 can therefore be pivoted out of the closed position according to FIG. 1 in direction $u_2$ into the open position, while the cover part 14 can be pivoted out of the closed position in direction $u_1$ into the open position. The movement from the open position to the closed position takes place in the reverse direction.

The pivot axes $a_1$ and $a_2$ are at opposing lateral regions 43 and 44 of the base 11. A free end region 45 of the cover part 13 is adjacent in the closed position to a free end region 46 of the cover part 14. A gap 47 is formed between the end regions 45 and 46.

In FIG. 2, the cover part 13 is in the open position, while the cover part 14 is in the closed position. The cover part 14 can be moved in the same way between a closed position and an open position. In the open position of one of the cover parts 13 or 14 or of both cover parts 13 and 14, access is possible via an opening 42 of the base 11 to a storage compartment, not shown here, with a container.

Each cover part 13 and 14 can be latched in the closed position by a latch 15 (see FIG. 2). Of the latch 15 only latching means 23 are discernible that are formed on the base 11. Latching means of the latch 15 on the cover side are not depicted in FIG. 2. The latch 15 is movable between a latching position and a release position. In the latching position of the latch 15, at least one of the cover parts 13 and 14 is latched when the cover part 13 and/or 14 is located in the closed position. In the release position, the latch 15 releases both cover parts 13 and 14, so that movement into the open position is possible.

Each cover part 13 and 14 is biased by an actuating device 50 with a spring 16 (see FIG. 5) into the open position. The spring 16 is formed in the present embodiment as a torsion spring with two legs. A first leg 17 of the spring 16 loads the cover part 13 or 14, a second leg 18 is supported on a face of a support 21, the function of which will be explained below. Each end region of the spring 16 is termed a leg here. The spring 16 is supported on a pivot pin 19 of the base 11.

To be able to set the spring force for synchronization of the opening movement of the cover parts 13 and 14, the cover 10 has an adjuster 20a for the cover part 13 and an adjuster 20b for the cover part 14. Alternatively, also only one of the covers 13 or 14 could have an adjuster. In this case the spring biasing of the cover part that has an adjuster is set so that the cover part opens at the same speed as the other cover part that has no adjuster. By having a respective adjuster 20a or 20b on each of the cover parts 13 and 14, more precise adjustment and adjustment when the limit of an adjustment range is attained are possible.

Since the adjusters 20a and 20b are the same in principle, only the adjuster 20a is described below.

Figure 4:
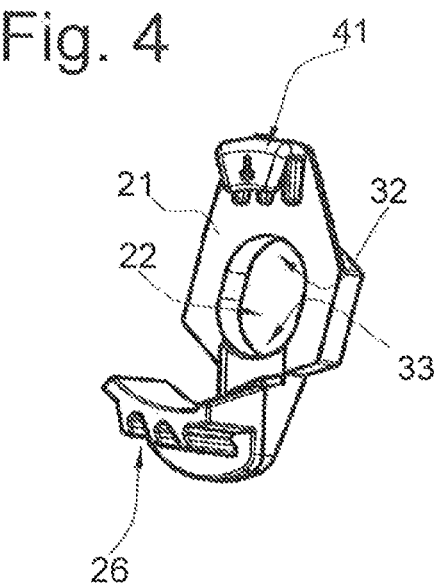
Figure 5:
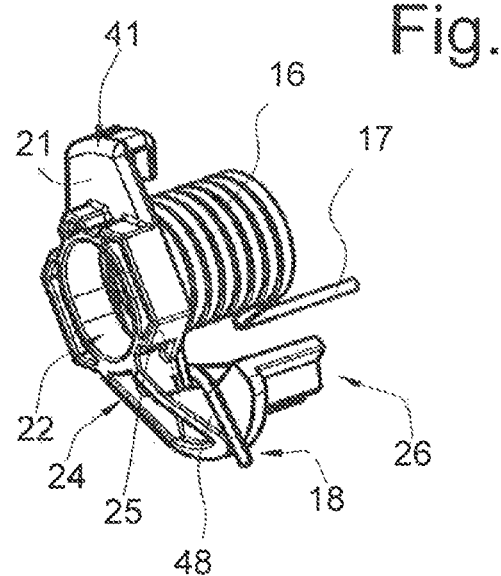
Figure 6:
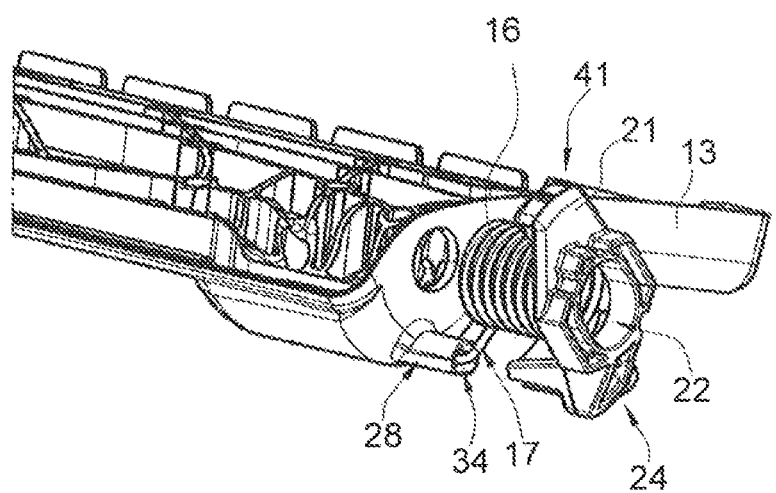

The adjuster 20a comprises, according to FIGS. 4 and 5, the support 21 that is supported on the pivot pin 19. Reference is made at this point to the fact that the support 21 in FIGS. 1, 2, 7, 8 and 9 is formed visually somewhat differently than in FIGS. 4 to 6 and 12 to 14. In regard to the function, however, the visually different implementations are the same parts. The support 21 comprises an opening 22, through which the pivot pin 19 engages so that the part is pivotable about the pivot axis $a_1$. An arm 24 of the support 21 extends radially to the pivot axis $a_1$. The arm 24 comprises support formation 25 in the form of a contact surface of a leg seat 48 (see FIG. 5) for supporting the leg 18 and locking formation 26 that interact with counterlocking formation 27 of the base 11 (recognizable in FIG. 2). The locking formation 26 and the counterlocking formation 27 are part of a locking device 40.

According to an alternative implementation, the support 21 as well as the counterlocking formation 27 could be formed on the cover part 13 and/or 14. If the locking formation 26 and counterlocking formation 27 are in engagement, the support 21 is supported on the pivot pin 19 and the counterlocking formation 27. The locking formation 26 can be in engagement with the counterlocking formation 27 in different relative positions. The different relative positions correspond to different biasings of the spring 16. The support 21 is movable relative to the counterlocking formation 27 between an engagement position in which the locking formation 26 and the counterlocking formation 27 are in engagement, and a release position, in which they are disengaged.

Here the locking formation 26 and the counterlocking formation 27 are formed by interacting gear teeth. The counterlocking formation 27 comprise teeth that lie on a partial circle with the center on axis $a_1$. Formed on the support 21 according to FIG. 4 are teeth that interact with the teeth of the base 11. In a pivoting of the support 21 of the adjuster 20a in the direction $p_2$ here, a ratcheting movement is possible without movement of the support 21 into the release position, while the support 21 must be moved into the release position to be able to pivot it in the direction $p_1$. Alternatively, an adjustment into the release position can be necessary for both movement directions $p_1$ and $p_2$ of the support 21.

The covers 13 and 14 each comprise a projection 28 (see FIG. 6) that engages through a slot 29 of the base 11. The movement of the cover part 13 is limited in this way. The projection 28 is also in contact with the leg 17 in such a way that the leg 17 loads the projection 28 and thus the entire cover part 13 into the open position. In the present embodiment, the projection 28 has a recess 34 into which the leg 17 can be inserted. Alternatively, any positive-locking or friction-locking connection is conceivable, however.

In the closed position of the cover part 13, the projection 28 is mounted on a first end region 30 of the slot 29. In the open position, the projection 28 is located at a second end region 31 of the slot 29. The leg 17 thus moves together with the projection 28. The leg 18 is basically fixed relative to the frame 11. If an adjustment of the biasing of the spring 16 is undertaken, however, the leg 18 is moved relative to the leg 17. Here the leg 18 always rests on the support formation of the support 21 that forms an abutment for the leg 18.

The locking devices 40 of the adjusters 20a and 20b are discernible in FIG. 2. The opening 22 of the support 21 is formed as a slot. The support 21 is therefore movable on the pivot pin 19a between an engaged position and a release position. In the engaged position, the locking formation 26 engage with the counterlocking formation 27 and the pivot pin 19 is located at an end region 32 of the opening 22. In the release position, the locking formation 26 and the counterlocking formation 27 are out of engagement and the pivot pin 19 is mounted on an end region 33 of the opening 22. The locking formation 26 and the counterlocking formation 27 are formed as teeth in the present embodiment. They can also be formed by other locking formation that interact in a positive-locking or friction-locking manner, however. For example, the locking formation and the counterlocking formation could also be fixable in different relative positions to one another by catching.

The support 21 is biased by the leg 18 of the spring 16 radially outwards relative to the pivot axis $a_1$ into the engagement position. Adjustment into the release position takes place against the spring force of the leg 18.

Operation between the engagement position and the release position can take place at an actuation attachment 41 that is formed on the support 21.

Figure 7:
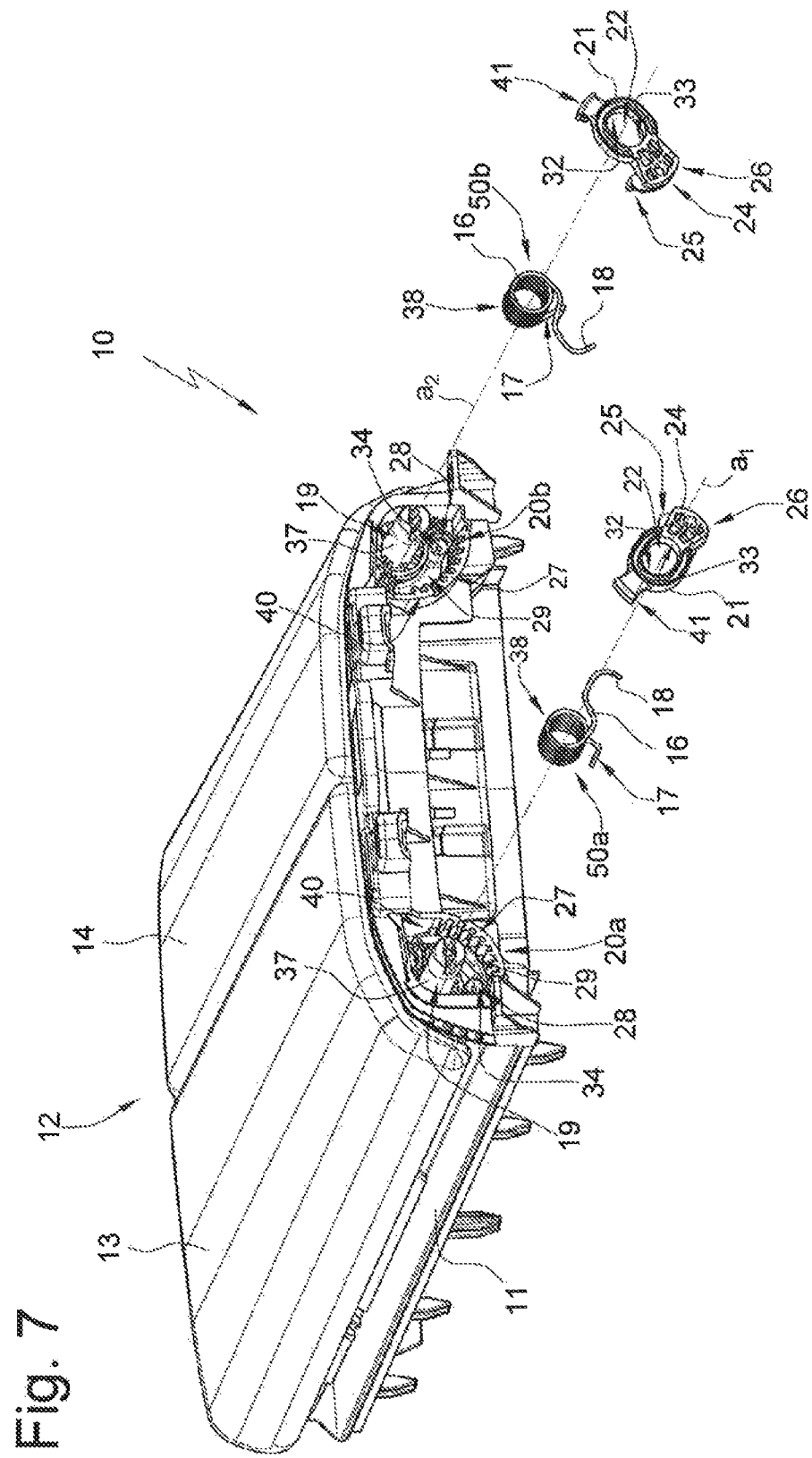
Figure 8:
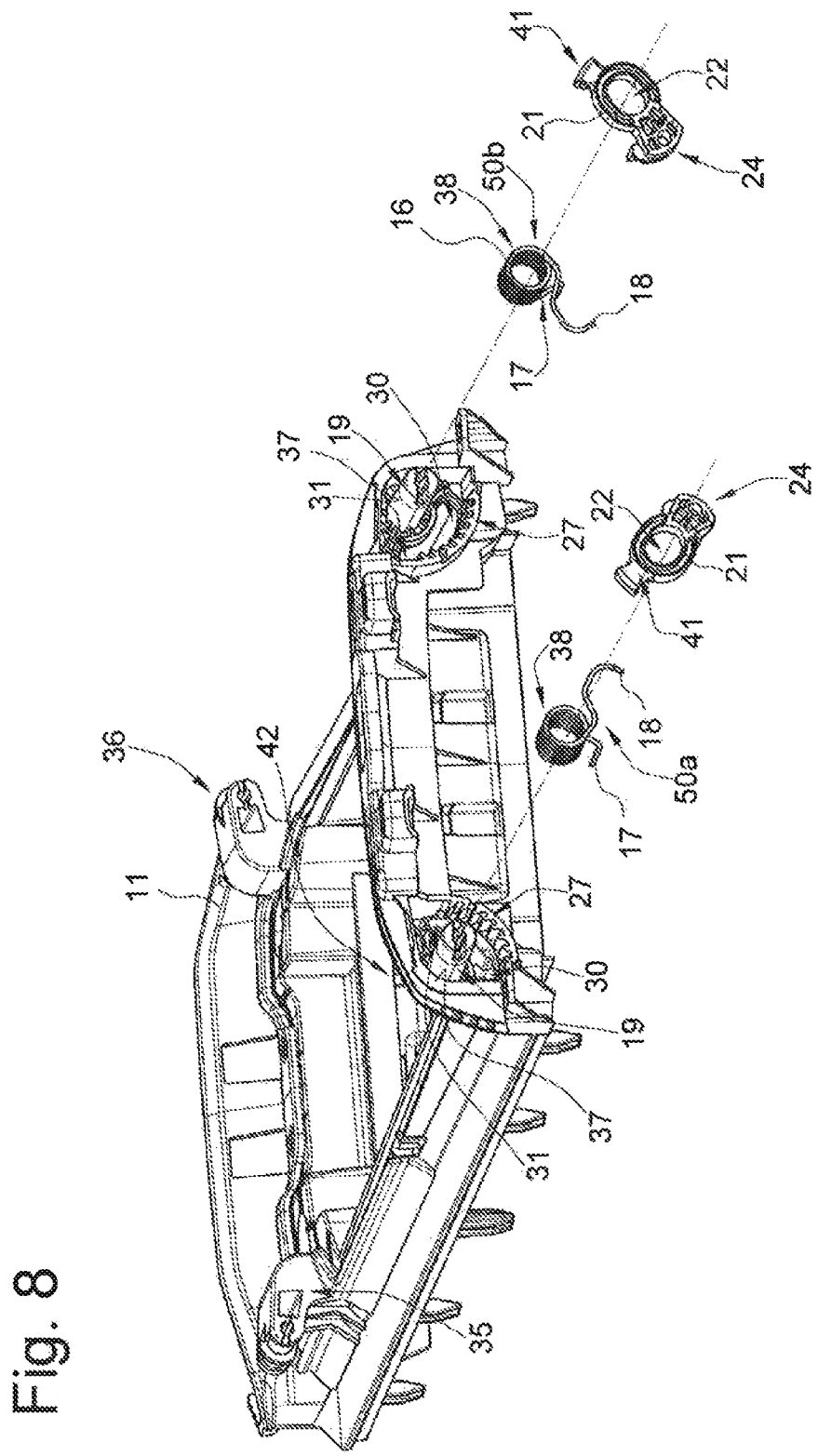

FIG. 7 is a perspective view of the cover according to FIG. 1, where the adjuster is shown in an exploded view. FIG. 8 differs from FIG. 7 in that the cover parts 13 and 14 are not shown for the sake of clarity.

In FIG. 8 the base 11 is depicted without the cover parts 13 and 14. Bearing devices 35 and 36 in the form of bearing arms are formed on the base 11, where only one bearing arm of each bearing device 35 and 36 is recognizable in FIG. 8. Each bearing device 35 and 36 comprises two bearing arms, however. The pivot axes $a_1$ and $a_2$ are formed by the bearing devices 35 and 36, where the pivot axis $a_1$ or $a_2$ in the present embodiment is aligned with a longitudinal axis of the pivot pin 19 of the respective adjuster 20 that must not necessarily be the case.

Figure 9:
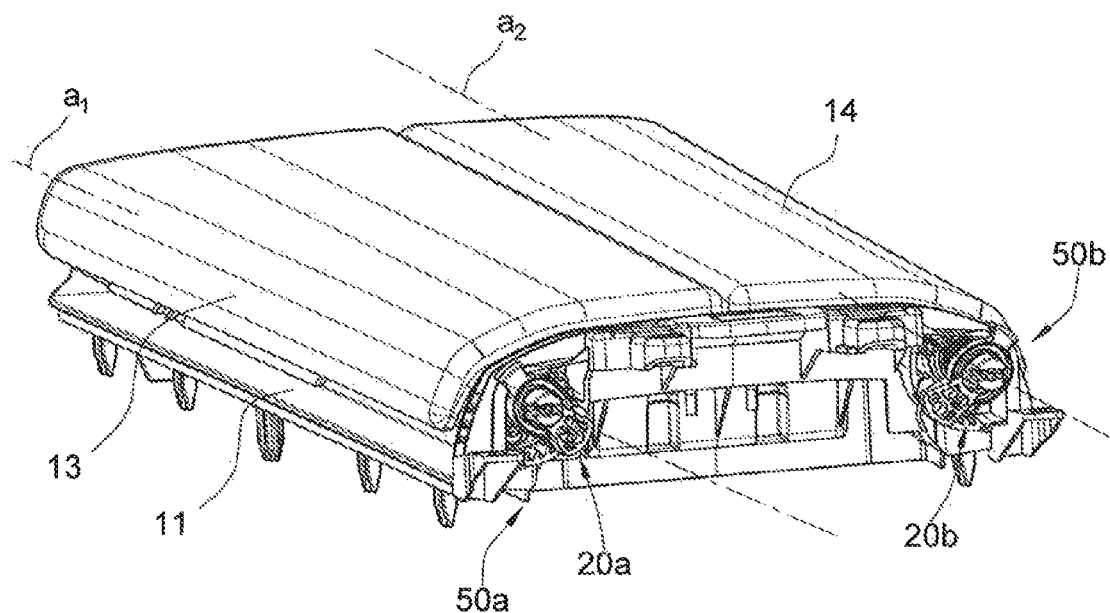
Figure 10:
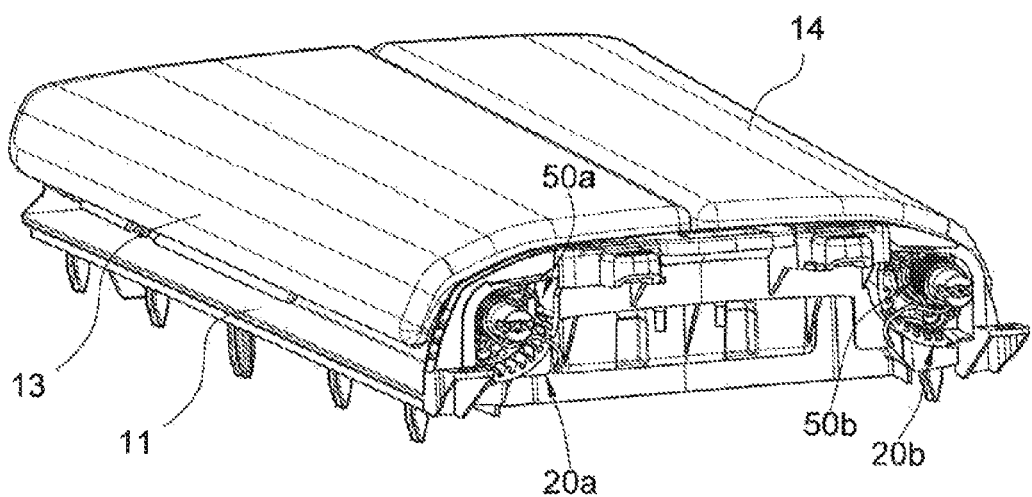
Figure 11:
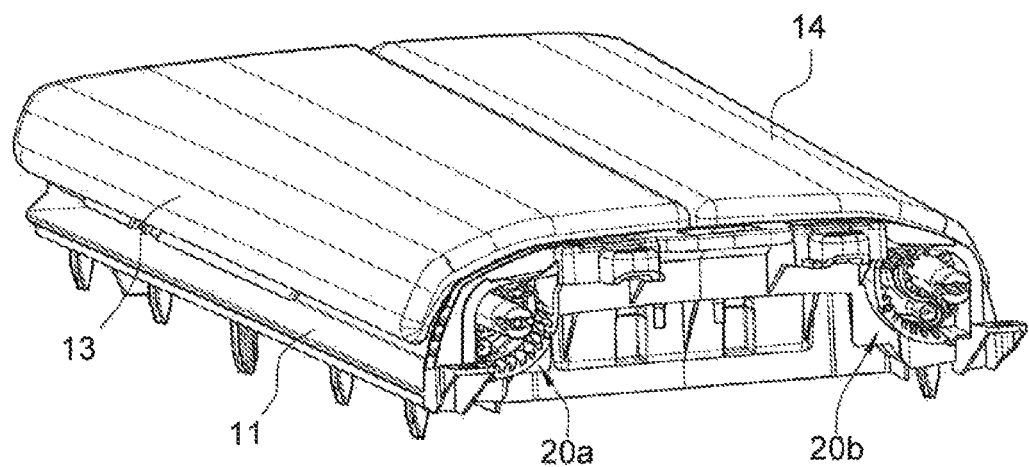

In FIG. 9, the cover 10 according to FIG. 1 is depicted in a perspective view, where the cover parts 13 and 14 are located in the closed position. FIG. 10 differs from FIG. 9 in that for the sake of clarity the supports 21 are not shown. FIG. 11 differs from FIG. 9 in that the supports 21 and the springs 16 are not shown.

The functioning of the cover 10 is described below

If the latch 15 (not shown in greater detail here) is shifted from the latching position to the release position, which takes place simultaneously for both cover parts 13 and 14 in the present embodiment, the cover part 13 moves under the loading of the spring 16a in direction $u_2$ and the cover part 14 moves under the loading of spring 16b in direction $u_1$ synchronously out of the closed position according to FIG. 1 into the open position. The cover part 13 can then be moved manually against the force of the spring 16 in the direction $u_1$ and the cover part 14 in the direction $u_2$ back into the closed position, in which the respective cover part 13 and/or 14 is automatically latched by the latch 15.

The cover parts 13 and 14 can be latched individually, i.e. the latching of one of the cover parts 13 and 14 is possible even if the other cover part is still in the open position. In other words, the latch 15 moves automatically and separately into the latching position for each cover part 13 and 14 as soon as the respective cover part is located in the closed position.

When the latch 15 is moved to the release position, the cover parts 13 and 14 move simultaneously into the open position. To guarantee the synchronous movement and to be able to undertake readjustment for example in the event of fatigue of the spring 16, the biasing of the springs 16 can be set by the adjusters 20a and 20b. As mentioned above, it would even be sufficient for synchronization if one of the adjusters 20a or 20b were present.

To adjust the locking device 40 of the respective adjuster 20a and 20b, the support 21a or 21b can be moved radially to the pivot axis $a_1$ or $a_2$ against the spring force of the leg 18 in such a way that the pivot pin 19 is moved from the end region 32 of the opening 22 from the engagement position to the end region 33 into the release position. The locking formation 26 are out of engagement with the teeth 27 in the release position.

The adjustment of the biasing force takes place for both adjusters 20a, 20b, substantially identically, but the adjusters 20a and 20b are constructed as mirror images. An increase in the spring tension occurs in the adjuster 20a by pivoting the support 21 in direction $p_2$ and in the adjuster 20b by pivoting the support 21 in direction $p_1$.

Below only the adjuster 20a is to be explained based on FIG. 12. The support 21 can be pivoted, without movement into the release position, counter-clockwise in direction $p_2$ relative to the teeth 27 in order to increase the biasing or—following a movement of the support into the release position—be pivoted in direction $p_1$ to reduce the biasing.

If the support 21a is then relieved, the leg 18 moves the support 21a so that the pivot pin 19a moves into the end region 32, where the locking formation 26 move into engagement with the counterlocking formation 27. The locking device 40 is then back in the engagement position. As long as the opening movement of the cover parts 13 and 14 do not run synchronously, readjustment can take place in the manner described with the support.

Figure 12:
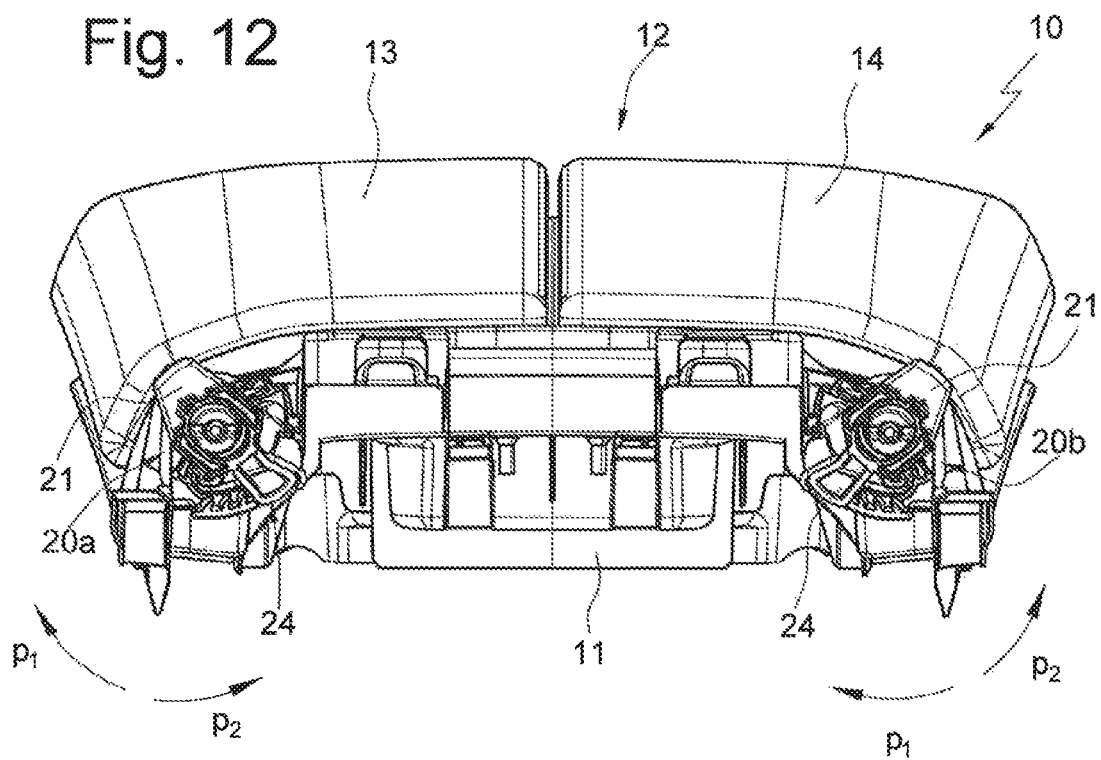
Figure 13:
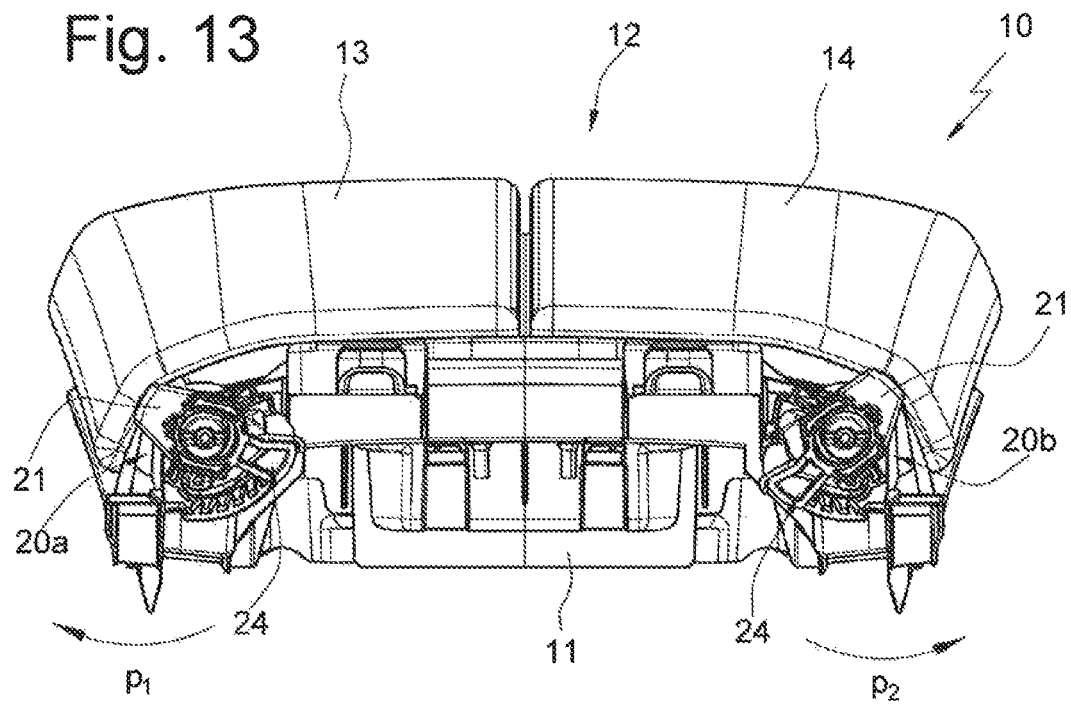

According to FIG. 13, the support 21 was rotated relative to the position according to FIG. 12 in direction $p_2$ and latched in the set position. The biasing of the spring 16 was thus increased in relation to the setting according to FIG. 12. If a reduction in the spring tension is desired, the support 21 must be rotated in direction $p_1$.

Figure 14:
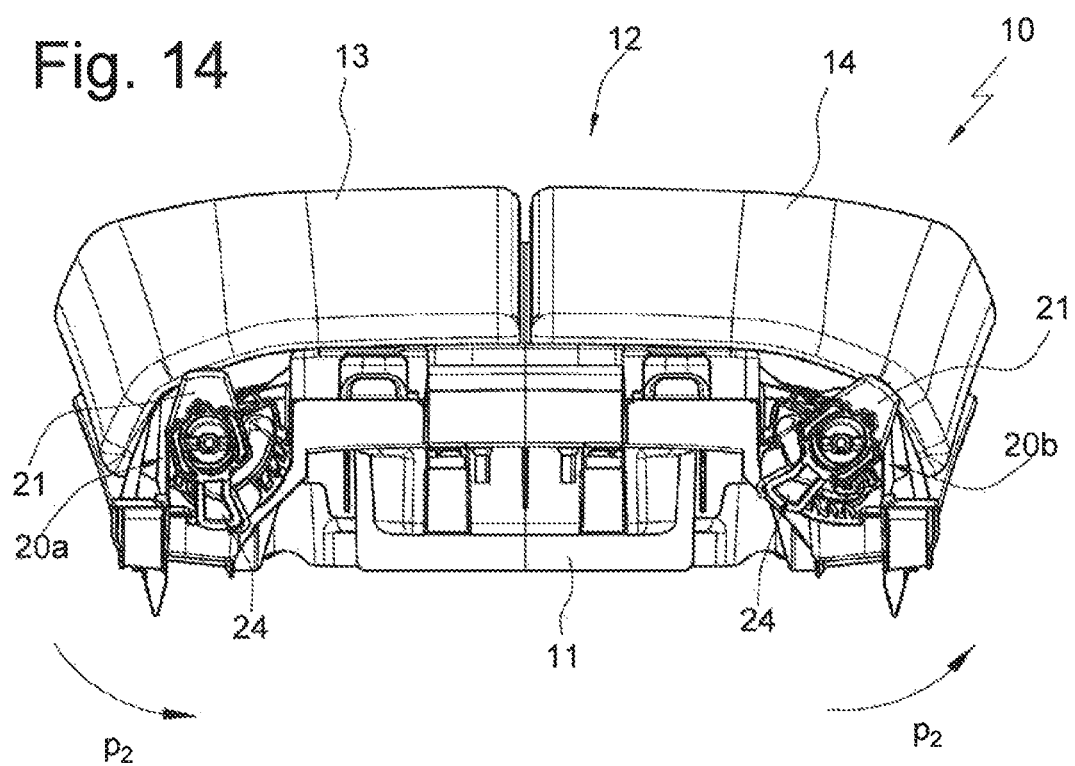

According to FIG. 14, the support 21 was pivoted in relation to the position according to FIG. 12 in direction $p_1$ and latched in the set position. The biasing of the spring 16 was thus reduced in relation to the setting according to FIG. 12.

The assembly of the cover 10 is described below: The cover parts 13 and 14 are inserted into the mounting seat on the bearing arms of the bearing devices 35 and 36 so that the projections 28 of each cover part 13 and 14 engage through the slot 29.

Then the springs 16 are placed onto the pivot pin 19 of the respective adjusters 20a and 20b, so that a central region 38 of the spring 16 coaxially entwines a sleeve surface 37 of the pivot pin 19. The leg 17 is inserted into the recess 34 of the projection 28. The leg 18 is connected to the support formation 25 of the leg seat 48 of the arm 24 and the support 21 is placed onto the respective pivot pin 19. A securing element 39 is attached to the pivot pin 19 to prevent axial detachment of the spring 16 and the respective support 21a and 21b from their seat on the pivot pin 19.

The invention claimed is:

1. A cover assembly comprising:
   a base;
   a first cover part and a second cover part each movable relative to the base about a respective pivot axis between a closed position and an open position;
   respective first and second torsion springs mounted on respective pivot pins, biasing the cover parts into the respective open positions, and each having one leg supported on the base and another leg braced against the respective cover part;
   a latch for holding the cover parts in the closed positions and shiftable between a latching position and a release position;
   an adjuster for setting the biasing of at least one of the springs and having a support for the one leg of the one spring that is on the base or the cover part, that is pivotal on the respective pivot pin, and that is formed with a slot through which the respective pivot pin engages;
   a locking formation on the support;
   a counterlocking formation detachably engageable with the locking formation in different relative positions such that different spring tensions can be set; and a support formation on the support and on which the one leg of the one spring is supportable.

2. The cover according to claim 1, wherein the base is formed by a frame with an opening.

3. The cover according to claim 1, wherein each cover part is pivotal on the base.

4. The cover according to claim 1, wherein the first cover part is pivotable about a first pivot axis and the second cover part is pivotable about a second pivot axis.

5. The cover according to claim 4, wherein the first pivot axis is mounted on a first lateral region of the base and the second pivot axis is mounted on a second lateral region of the base opposite the first lateral region.

6. The cover according to claim 1, wherein the support has a radial arm on which the support formation and/or the locking formation is formed.

7. The cover according to claim 1, wherein the support forms a leg seat for the respective one leg, the seat at least partially having the support formation.

8. The cover according to claim 1, wherein the support is pivotal about the pivot axis of the respective cover part.

9. The cover according to claim 1, wherein the locking formation and the counterlocking formation are formed by meshed gear teeth or by interacting clamping surfaces.

10. A storage compartment with a container with an opening via which the container can be accessed, wherein the opening can be closed by a cover assembly, wherein the cover is formed according to claim 1.

11. A cover assembly comprising:
a base;
a first cover part and a second cover part each movable relative to the base about a respective pivot axis between a closed position and an open position;
respective first and second torsion springs mounted on respective pivot pins, biasing the cover parts into the respective open positions, and each having one leg supported on the base and another leg braced against the respective cover part;
a latch for holding the cover parts in the closed positions and shiftable between a latching position and a release position;
an adjuster for setting the biasing of at least one of the springs and having a support for the one leg of the one spring that is on the base or the cover part and that is pivotal on the respective pivot pin;
a locking formation on the support;
a counterlocking formation detachably engageable with the locking formation in different relative positions such that different spring tensions can be set, the locking formation and the counterlocking formation being formed by meshable gear teeth;
an operating formation on the support manually operable to engage and/or disengage the gear teeth; and
a support formation on the support and on which the one leg of the one spring is supportable.

* * * * *